United States Patent [19]

Moegle

[11] 3,904,772
[45] Sept. 9, 1975

[54] METHOD OF PREPARING A MEAT ROLL
[76] Inventor: Vernon L. Moegle, 5561 Viewpoint Ln., St. Louis, Mo. 63128
[22] Filed: Dec. 9, 1974
[21] Appl. No.: 530,552

Related U.S. Application Data
[63] Continuation-in-part of Ser. No. 431,208, Jan. 7, 1974, abandoned, which is a continuation-in-part of Ser. No. 271,010, July 12, 1972, abandoned.

[52] U.S. Cl. ................. 426/293; 426/92; 426/289; 426/297; 426/641
[51] Int. Cl.² .......................................... A23L 1/31
[58] Field of Search ............ 426/92, 106, 297, 293, 426/289

[56] References Cited
UNITED STATES PATENTS
3,666,489   5/1972   Lovell ................................ 426/297

OTHER PUBLICATIONS
Lord, "Everybody's Cookbook," 1924, published by Harcourt, Brace & Co., New York, page 475, article entitled Meat Method II.

Primary Examiner—Hyman Lord
Attorney, Agent, or Firm—Bedell and Burgess

[57] ABSTRACT

An article of food and the method of making same, wherein a meat roll is formed of wafer-sliced meat, preferably fresh or corned beef, coated thinly on both sides throughout its area with oil and a bread or cracker crumb mixture both to a uniform thickness, and provided on one side only along one margin with flavoring material such as an onion and tomato mixture with fresh beef, or sauerkraut and Swiss cheese with corned beef, and after coating, tightly rolled up and secured in its rolled-up condition. Grated cheese may be provided along with the crumbs in the coating, and the meat roll may be cooked and eaten, or cooked and frozen for subsequent consumption, or it may be frozen raw for subsequent use.

4 Claims, 5 Drawing Figures

METHOD OF PREPARING A MEAT ROLL

BACKGROUND OF THE INVENTION

This application is a continuation-in-part of copending application Ser. No. 431,208, which is a continuation-in-part of my application Ser. No. 271,010, filed July 12, 1972, both now abandoned.

The invention relates to food products and consists of an article of food in the form of a meat roll made from thinly sliced meat, and to the method of making the meat roll.

Examples of prior art include U.S. Pat. No. 3,666,489 to Lovell; and Lord, Everybody's Cook Book, 1924, published by Harcourt, Brace & Co., New York, page 475, article entitled "Meat Method II." In Everybody's Cook Book it is specified that the thickness of the meat is ¼ inch and 2½ inches by 4 inches in area, and in the Lovell Patent it is specified that the thickness of the meat is 1/16 to ½ inch thick and weighs 4 ounces. In Everbody's Cook Book the only coating is seasoned flour, which is also used for browning and to form a gravy base, and in Lovell "stuffing" is spread almost "all over" the meat slice. The article described in Everybody's Cook Book would have to be seared for 5 to 8 minutes, and then braised for at least 30 minutes longer to cook it thoroughly. The Lovell poultry product would have to be baked to an internal temperature of 150° to 170° to insure that it would be thoroughly cooked inside because of the thickness of the roll resulting from the use of thick meat weighing 4 ounces and a large amount of stuffing.

SUMMARY OF THE INVENTION

The invention provides an article of food composed of a wafer-thin slice of meat, preferably fresh or corned beef, coated with oil, a bread crumb mixture, and flavoring material such as an onion-tomato mixture or sauerkraut and Swiss cheese, and tightly rolled up for cooking and serving. The term wafer-thin as used herein is intended as the thinnest slice of the meat that can be sliced and rolled without breaking up of the meat, and is preferably about 1/32 inch thick, although the slice can be up to ⅛ inch thick. The slice is also about 6 inches long and 5 inches wide and weighs approximately ¾ ounce, although the length and width and shape of the slice can be varied. The finished meat roll has a thickness or diameter from a minimum of ½ inch to a maximum of 1½ inches, although the diameter is preferably in the range of from about 1 inch to about 1¼ inches, and a grated cheese or cheese product can be used with the crumbs in the coating. Moreover, the meat roll may be broiled or deep fried, as desired, and because of the thin sliced meat very little time is required to cook the meat roll, thus making it practicularly suitable as a "convenience" food, or fast order item at restaurants and the like. In the meat roll of the present invention the crumbs serve as both a stuffing and a uniform coating on the meat roll. If it is desired to deep fry the meat roll of the invention, it is dipped in a suitable batter.

Among the objects and advantages of the invention are the following:

It provides a vendable food product adjustable to diverse types of food or serving operations including drive-ins, restaurants, and homes.

Its size is variable and its shape adjustable to many applications.

Its cooking time is short as a result of the thinness of the meat slice.

The thinness of the meat slice and the uniformity and thinness of the intervening coating result in a substantially homogeneous article as distinguished from prior art rolled meat products in which thick layers of meat are separated by a thick stuffing.

Its cost is low because the thin wafer-slicing results in a large number of rolls per pound of meat and permits the use of a lower grade of meat than would be otherwise acceptable.

It is readily amenable to freezing in either the raw or fully cooked states.

BRIEF DESCRIPTION OF THE INVENTION

Figure 1:
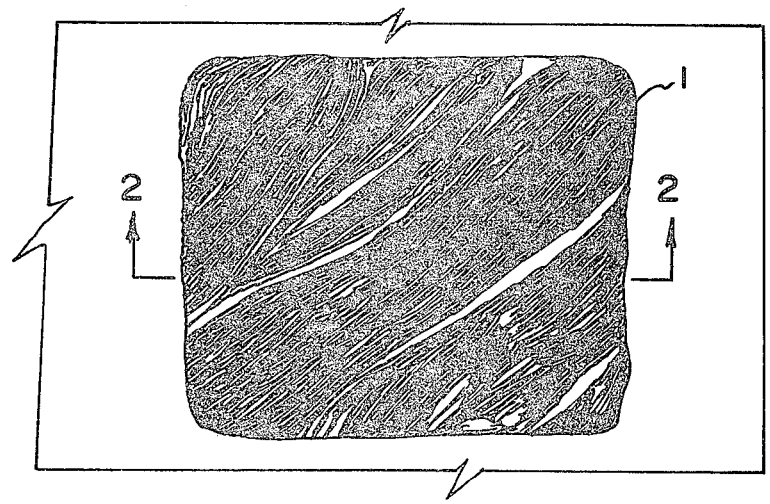
FIG. 1 is a top view of a rectangular slice of meat.
Figure 2:
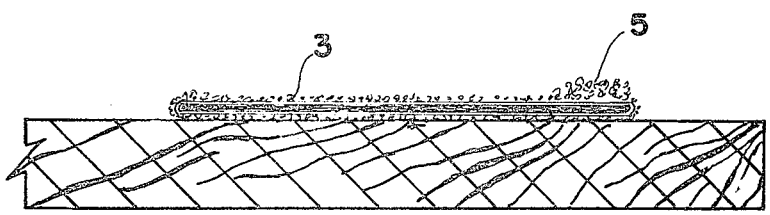
FIG. 2 is a longitudinal vertical sectional view along line 2—2 of FIG. 1, showing coatings applied to the slice.
Figure 3:
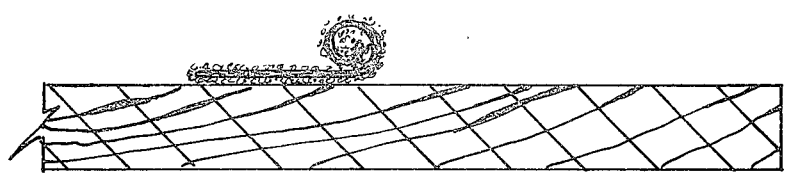
FIG. 3 is a side view of the slice partly rolled up.
Figure 4:
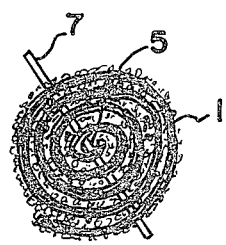
FIG. 4 is an end view of the completed meat roll.
Figure 5:
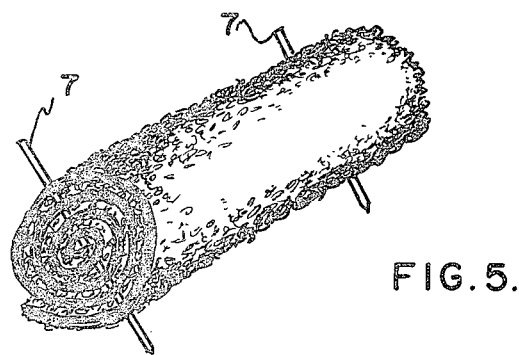
FIG. 5 is a perspective view of the completed roll.

The numeral 1 denotes a wafer-thin, generally rectangular slice of meat, preferably fresh beef, approximately 1/32 inch thick, preferably about 6 inches long and 5 inches wide and weighing about ¾ ounce. After slicing, the meat slice is dipped in cooking oil, which may be vegetable, olive, sunflower or the like, or any desired combination of such oils, and thereafter is held up to drain excess oil off it.

A mixture 3 comprising one to three, preferably two, cups of bread or cracker crumbs and, if desired, one to three, preferably two, cups of grated cheese, preferably Romano, one-half teaspoonful of fresh powdered salted garlic, salt if desired, any amount from zero to three teaspoonsful of monosodium glutamate and one-half teaspoonsful of pepper, is thoroughly mixed in a bowl and the slice of meat is laid on the resultant bread crumb-grated cheese mixture until thoroughly coated on all surfaces thereof with a uniform coating of the crumb mixture. This method of coating will provide thin oil and bread crumb-grated cheese coatings of substantially uniform thickness and in an amount such as will adhere to the oil-wetted slice of meat.

The coated meat is then laid flat on a board with its narrow 5-inch side toward the preparer, and if desired, about three-fourths tablespoonsful of flavoring material, consisting of finely chopped onions and tomatoes is spread along the short margin of the meat nearest the preparer, as at 5.

Commencing at this margin, the coated meat is rolled up tightly and secured in its rolled-up condition by a pair of toothpicks 7 to form a substantially homogeneous roll by reason of the thinness of the meat and the uniformity and thinness of the coatings. The meat rolls may be placed in a broiling rack, if desired, or appropriately placed on a baking sheet or the like, and the toothpicks left out. The use of wafer-sliced meat coated with thin and uniform coatings and tightly rolled up provides a product in which the coating ingredients are thoroughly distributed throughout the roll and thoroughly permeate the roll, while the entire roll, except for the central core, has the texture of the meat ingredient because of the narrow helical space between the successive coils of meat occupied by the thin coatings.

The roll thus produced may be frozen raw for use later, or may be broiled on both sides until light golden or golden in color, approximately 6 to 8 minutes per side, for immediate consumption or for freezing.

Because of its structure, the resultant roll can be used as a fast-cooked "convenience" food article, as distinguished from all rolled meat products of which applicant is aware which require much longer cooking periods and hence are not adaptable for use as "convenience" food products.

Alternatively, the roll may be prepared for consumption by dipping it in a batter and deep-fat frying it in oil or vegetable shortening.

In a modified form, raw corned beef may be used in place of fresh beef, Swiss cheese substituted for Romano in the bread crumb and grated cheese mixture, and sauerkraut and a small slice of Swiss cheese substituted for the onion and tomato flavoring material.

Other flavoring materials which might be used in place of the onion and tomato or sauerkraut and Swiss cheese combinations mentioned above are cooked bacon, chopped mushrooms, peperoni sausage, fried pork sausage, chopped green pepper and onion, chopped olives, or a combination of tomato, oregano spice and a slice of mozzarella cheese, to provide an Italian pizza flavor.

The details of the product may be varied substantially without departing from the spirit of the invention and the exclusive use of those modifications coming within the scope of the claims is contemplated.

I claim:
1. A method of preparing a meat roll, comprising the steps of:
   slicing a wafer-thin slice of raw meat;
   dipping the slice of raw meat in vegetable cooking oil and thus coating the slice on all sides with vegetable cooking oil;
   placing the oil-coated slice of raw meat on a mixture of bread or cracker crumbs and grated cheese and coating the surfaces of said slice of raw meat with a uniform layer of said mixture adherent to the oil-coated slice of raw meat; applying a coating of flavoring material consisting of finely chopped onions and tomatoes along only one of the short marginal edges of said coated slice of raw meat; and tightly rolling said coated slice of raw meat lengthwise about the flavor-coated short marginal edge to form a meat roll with the coating of flavoring material disposed at the center of the meat roll and wherein the ingredients of the mixture are uniformly distributed throughout said meat roll.

2. The method of claim 1, including the step of freezing the meat roll for subsequent use.

3. The method of claim 1, including the step of broiling the meat roll unit it is golden brown on its outer surface.

4. The method of claim 1, including the steps of dipping the coated meat roll in batter, and deep-frying the coated roll.

* * * * *